Dec. 31, 1957 A. DE VERE HARNETT 2,818,129
DIFFERENTIAL DRIVE MECHANISM SEAL
Filed July 14, 1955

INVENTOR
A. DeVere Harnett
BY
Mason, Kolehmainen,
Rathburn and Wyss
ATTORNEYS

2,818,129

DIFFERENTIAL DRIVE MECHANISM SEAL

A. De Vere Harnett, Racine, Wis.

Application July 14, 1955, Serial No. 522,113

3 Claims. (Cl. 180—75)

The present invention relates to a differential drive mechanism and more particularly to a differential drive mechanism for a lawn mower, which mechanism includes means for preventing grass and other foreign material from entering into the differential gear assembly.

Differential gear mechanisms have long been known in the art but those type which are suitable for use on the drive axle of lawn mowers generally suffer from the disadvantage that unless expensive seals are used, dirt and other foreign matter enter into the gear assembly, thereby adversely to affect the efficiency of operation of the mower.

Therefore, an object of the present invention is to provide a differential drive mechanism suitable for use in power driven lawn mowers and which includes a reliable and inexpensive arrangement for preventing grass and other foreign material from entering into the working parts of the differential gear assembly.

Another object of the present invention is to provide a new and improved sealing arrangement for a differential gear assembly.

A further object of the present invention is to provide a new and improved foreign particle protector for incorporation in the differential drive mechanism of a lawn mower.

Briefly, in accordance with the present invention, the above objects are realized by providing an axially extending annular flange on the hub of one wheel of a lawn mower, the flange extending around the outer periphery of the differential spider so as to compress a flexible annular sealing member which is mounted in an annular groove in the periphery of the said spider.

Figure 1:
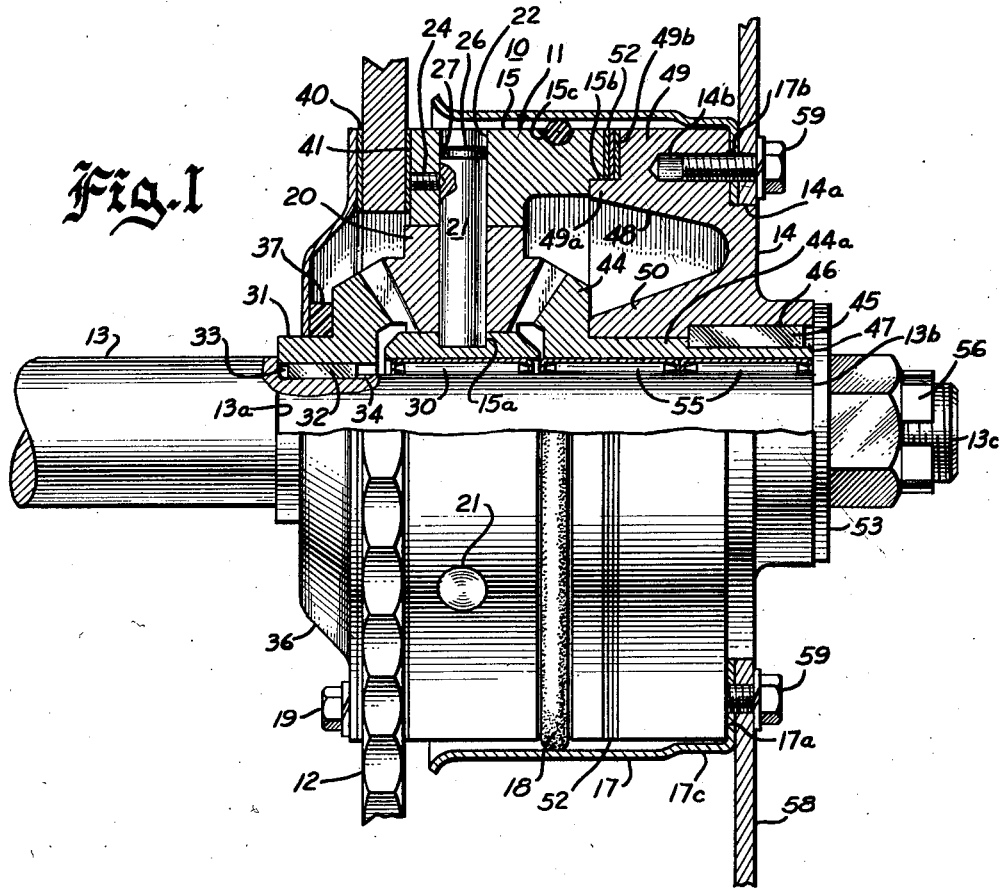
Figure 2:
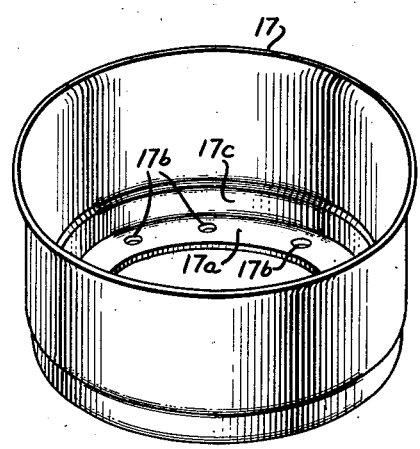

The invention, both as to its organization and method of operation, together with further objects and advantages thereof, will best be understood by reference to the following description taken in connection with the accompanying drawings, in which:

Fig. 1 is an elevational view of a differential drive mechanism incorporating the present invention, certain portions of the mechanism being broken away and other portions being shown in section so as to facilitate an understanding of the operation of the mechanism; and Fig. 2 is a perspective view of the differential cover of the present invention.

Referring now to the drawings, there is shown in Fig. 1 thereof a differential drive mechanism 10 including a differential gear assembly 11 which is adapted to be rotated by means of a sprocket 12 thereby to drive an axle 13 and a wheel hub 14 to effect locomotion of a lawn mower, it being understood that another wheel is attached to the left hand end of the axle 13. As is well known to those skilled in the art, when a lawn mower or other vehicle traverses a curved path, for efficient operation one wheel should rotate with respect to the other and, therefore, the wheel hub 14 must be rotated with respect to the axle 13. For this purpose a conventional differential drive mechanism including a differential spider or carrier 15 is provided, which rotates with respect to the hub 14 and the axle 13 when the lawn mower travels in a curved path. In order to prevent grass and other foreign matter from entering into the differential gear assembly a sealing arrangement is provided between these two members. Although highly efficient and expensive types of rotary seals such as, for example, a labyrinth seal, could be employed to keep out this foreign matter, since lawn mowers travel at a low speed and, therefore, the speed of the angular rotation of the spider 15 with respect to the wheel hub 14 is relatively low and since there is no appreciable pressure differential across this seal, it is possible to provide a more inexpensive arrangement for this purpose. Therefore, a hollow cylindrical differential cover 17 which may be constructed of metal or of a suitable plastic is secured to the wheel hub 14 and extends outwardly therefrom over the periphery of the differential spider 15 around the circumferential surface of which is mounted an annular resilient sealing ring 18, which in the final assembly is slightly compressed between the spider 15 and the cover 17. It may thus be seen, that an inexpensive yet effective seal is provided between the hub 14 and the spider 15 thereby to prevent any grass or foreign matter from entering into the differential gear assembly through the space necessarily provided between the hub 14 and the spider 15.

Considering the drive mechanism more in detail, the sprocket 12 is secured to the differential spider 15 by means of a plurality of hex-head bolts 19, only one of which is shown in the drawing. A plurality of differential pinion gears 20 are pivotally mounted on respective ones of the differential pinion gear shafts 21, the shafts 21 being secured in place in the spider 15 by means of respective ones of a plurality of set screws 24 which are received in suitable threaded bores in the spider 15. An annular recess 26 is provided in each of the differential pinion gear shafts 21 near the outer ends thereof for the housing of flexible O-rings 27 which seal the passage between the shafts 21 and their associated apertures 22 to prevent foreign material from entering into the mechanism. The inner ends of the shafts 21 are supported in the cylindrical recesses 15a which are provided in the hub of the spider 15, the surface of the hub surrounding the recesses 15a providing a bearing surface upon which the inner ends of the pinion gears 20 are urged.

So as to rotatably support the spider 15 on the shaft 13, a roller type sleeve bearing 30 is interposed between the shaft 13 and the hub of the spider 15, and in order to drive the shaft 13 from the sprocket 12 in the well-known manner, a short beveled hub gear 31 is keyed to the shaft 13 by means of a rectangular key 32 arranged in respective key ways 33 and 34 in the gear 31 and in the shaft 13, the teeth of the gear 31 meshing with the teeth of the pinion gears 20. As shown, an annular shoulder 13a is provided on the shaft 13 against which abuts the outer end of the hub gear 31.

In order to prevent foreign matter from entering into the differential gear assembly through the space provided between the hub gear 31, the sprocket 12 and the spider 15, a disk-like cover plate 36 is located over the hub of the hub gear 31 and an annular sealing washer 37 is provided between the rear face of the gear 31 and the cover plate 36. In addition, a pair of thin annular gaskets 40 and 41 are disposed respectively between the differential gear 12 and the cover plate 36 and the spider 15.

The wheel hub 14 is rotated by the sprocket 12 through the spider 15 by means of the mechanism comprising the differential hub gear 44 which is operatively attached to the pinion gears 20 and keyed to the hub 14 by means of a rectangular key 45 which is received in respective key ways 46 and 47 in the hub 14 and the extending hub 44a of the gear 44. In furtherance of reducing the weight of the differential drive mechanism and of conserving material, the hub 14 is provided with a deep annular recess 48 which is defined between respective outwardly and inwardly located annular flanges 49 and 50, the latter loosely abutting the rear face of the hub gear 44. The flange 49 is provided with an additional inwardly extending flange 49a thereby to define an annular notch 49b which surrounds one end of the hub 14 and is adapted to house a plurality of annular gaskets 52. The hub 15 is provided with an annular notch 15b which is adapted to receive the end of the flange 49a so that the gaskets 52 are held in closely adjacent relationship with one another thereby to provide an additional seal between the spider 15 and the hub 14 so that in the event that the sealing ring 18 becomes ineffective or in the event that the cover 17 and the sealing ring 18 are not used, some sealing of the differential gear assembly from the outside is provided.

In order to facilitate assembly of the drive mechanism and also to prevent the seal 18 from becoming displaced on the spider 15, an annular recess 15c is provided in the circumferential periphery of the spider 15 to partially house the seal 18. It has been found desirable to form the seal 18 of a graphite impregnated resilient material, such as, for example, rubber, so as to effect a good sliding seal between the cover 17 and the spider 15. As shown, the shaft 13 is provided with an additional annular shoulder 13b near the right hand end thereof against which is butted a washer-like bearing retainer 53 thereby to prevent the roller bearings 55 from moving out of the assembly, and in order to maintain the differential mechanism so assembled, a castellated nut 56 is secured to the shaft 13 on the threaded end 13c thereof.

The hub 14 is provided with an annular recess 14a in which the inwardly extending flange 17a of the cover 17 and that portion of the wheel 58 which connects the hub 14 with the rim is received. The flange 17a is provided with a plurality of holes 17b which register with similar holes in the member 58 and with the threaded bores 14b in the hub 14. A plurality of hex-head bolts 59 may thus be used to secure the cover 17 and the wheel 58 to the hub 14. That portion 17c of the cover 17 which is adjacent the flange 17a is reduced in size so as to have a diameter only slightly exceeding that of the hub 14 thereby to provide relatively accurate centering of the cover 17 on the hub 14. While in the drawing used to illustrate the invention the member 15 is a disk, it will be understood that other types of wheels such as the common spoke wheel may be employed with the present invention so long as the differential cover 17 is secured to the hub of the wheel. Also, the cover 17, if desired, may constitute an integral annular flange extending axially from the wheel disk.

Since the operation of the differential drive mechanism 10 will be apparent to those skilled in the art from the above description, no detailed explanation thereof is given. Briefly, however, when the torque exerted on hub 14 exceeds that exerted on the shaft 13, relative rotation between the hub 14 and the spider 15 takes place, thereby to cause the differential cover 17 to rotate with respect to the spider 15 and to slide around the sealing ring 18. The apparatus of the present invention while permitting relative freedom of movement between the wheel 58 and the spider 15, in an inexpensive and efficient manner prevents grass and other foreign matter from passing between these two members into the differential gear assembly.

While the invention has been described by means of a particular embodiment thereof, it will be understood by those skilled in the art that many changes and modifications may be made without departing from this invention. Therefore, the appended claims are intended to cover all such changes and modifications as fall within the true spirit and scope of the invention.

What is claimed as new and is desired to be secured by Letters Patent of the United States is:

1. Apparatus for preventing foreign matter from entering into the differential gear assembly of a differential drive mechanism of the type including a differential spider relatively rotatable with a wheel located nearby, comprising an annular flange on said wheel, said flange extending axially of said wheel around the outer periphery of said differential spider, means defining an annular groove in said spider opening toward said flange, and a resilient annular sealing member disposed in said groove, said member resiliently contacting said flange, thereby to prevent foreign matter from passing between the spider and the wheel.

2. Apparatus for preventing foreign matter from entering into the differential gear assembly of a differential drive mechanism of the type including a differential spider relatively rotatable with a wheel hub located nearby, comprising a hollow cylindrical member, said member being secured to said wheel hub, extending around and spaced from the outer periphery of said differential spider, and a flexible annular sealing member secured to said spider and interposed between said spider and the inner wall of said member, whereby foreign matter is prevented from passing between the spider and the hub.

3. Apparatus for preventing foreign matter from entering into the differential gear assembly of a differential drive mechanism of the type including a differential spider relatively rotatable with a driven wheel hub located nearby, said hub being imperforate, comprising a hollow cylindrical cover having an inwardly extending annular flange thereon, said cover being formed of sheet metal and having an enlarged end at the end opposite said annular flange, said cover being secured to said wheel hub by separate independent means interconnected between said hub and said flange so that at least the enlarged portion of said cover extends around the outer periphery of said differential spider and is spaced therefrom, said spider having an annular groove therein opening toward and overlying part of the enlarged portion of said cover, and a flexible annular sealing member disposed in said groove and resiliently engaging said portion of said cover, thereby to prevent foreign matter from passing between the spider and the hub.

References Cited in the file of this patent

UNITED STATES PATENTS

| | | |
|---|---|---|
| 2,214,457 | Fuhrman | Sept. 10, 1940 |
| 2,251,538 | Ash | Aug. 5, 1941 |
| 2,370,471 | Karlberg | Feb. 27, 1945 |

FOREIGN PATENTS

| | | |
|---|---|---|
| 466,062 | Germany | Oct. 1, 1928 |